Oct. 30, 1928.
F. W. MARTIN
POWER REVERSE GEAR
Filed Jan. 27, 1925
1,689,677
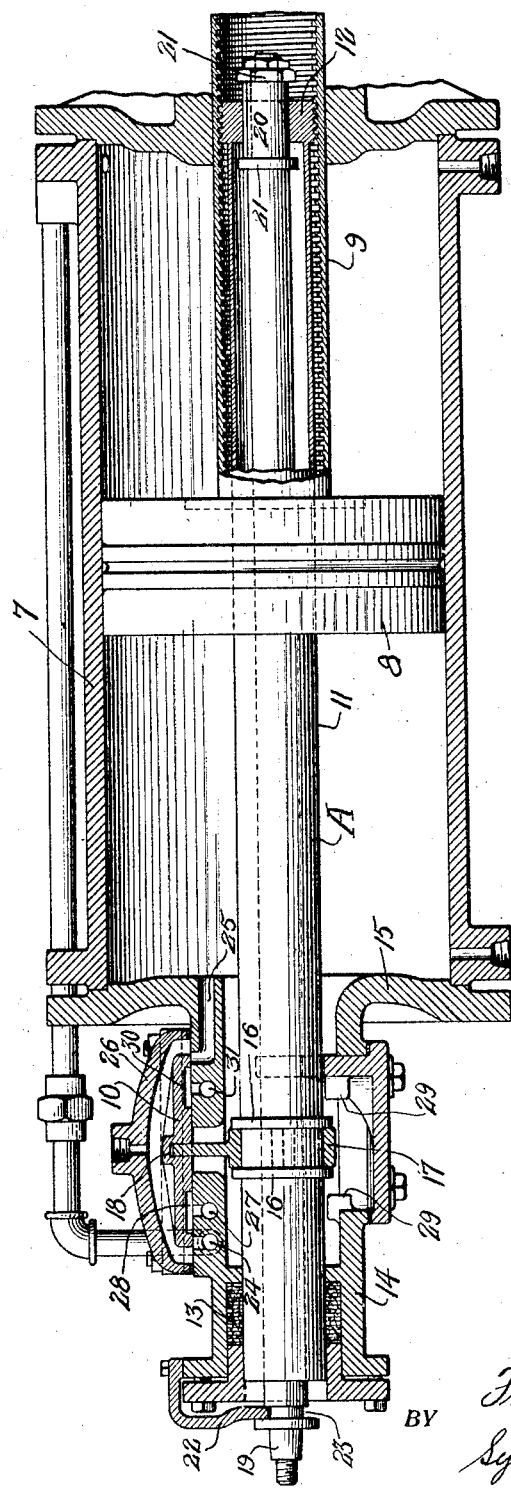
INVENTOR
Frederick W. Martin
BY
Synnestvedt & Lechner
ATTORNEYS Patented Oct. 30, 1928.

1,689,677

UNITED STATES PATENT OFFICE.

FREDERICK W. MARTIN, OF BROOKLYN, NEW YORK, ASSIGNOR TO FRANKLIN RAILWAY SUPPLY COMPANY, A CORPORATION OF DELAWARE.

POWER-REVERSE GEAR.

Application filed January 27, 1925. Serial No. 5,038.

This invention relates to power reverse gears of the servo-motor type and is especially useful for locomotives.

One of the primary objects of the invention is to provide a simple and effective form of gear constituting an improvement over the type of gear shown in the Roberts Patent No. 1,500,685. The gear of my invention is directed to obtaining the same general advantages as the gear of such patent, but by the improvements now to be described.

The foregoing, together with such other objects and advantages as may hereinafter appear, or are incident to my invention, I obtain by means of a construction which I have illustrated in the first form in the accompanying drawing, wherein the figure is a fragmentary longitudinal section through the gear illustrating my improvements.

Referring now to the drawings, the gear comprises a cylinder 7, in which there is a piston 8, having a hollow rod or extension 9 which may be connected to the link motion by a reach rod of suitable character (not shown); the valve 10 for controlling the admission to and exhaust of pressure from the cylinder on opposite sides of the piston; and the operating connection between the valve and the piston, generally designated by the reference character A.

This operating connection comprises a sleeve or tubular member 11 which has a head 12 at its inner end, which head is threaded for engagement with the rod 9 which is internally threaded as shown. Such head, therefore, is in effect a nut. The sleeve 11 has a suitable packing 13 in the cylindrical portion 14 of the cylinder head 15. At a point adjacent the valve 10 the sleeve 11 has two spaced annular shoulders 16 between which the connecting member 17 is swiveled. This member 17 has a tongue fitting within the recess 18 formed in the valve 10. By this arrangement the sleeve 11 may be rotated, relative to the connecting member 17, but when the sleeve shifts longitudinally such connecting member is shifted longitudinally so as to impart corresponding longitudinal movement to the slide valve 10.

The sleeve 11 is rotatably but slidingly connected to the rod 19 at its inner end 20 it being limited in its sliding movement in either direction by the abutments 21—21. The abutments are spaced a sufficient distance apart to allow full opening of the valve 10 in either direction. In this connection it is to be noted that the rod 19 is fixed against longitudinal movement by means of the fixed member 22 engaging the groove 23 in the rod adjacent the cylinder head 15. Thus it will be seen that the sleeve 11 is given rotary movement by virtue of its keyed or splined connection with the rod 19 as indicated at 20ª and longitudinal movement by virtue of its screw threaded engagement with the piston rod 9. Suitable shafting and coupling means connects the rod 19 to an operating hand wheel in the cab of the locomotive.

Reverting now to the valve mechanism it will be seen that the valve 10 is shown in neutral position and that the length of the valve is such that it cannot at the same time cover the port 24 communicating with the forward end of the reverse cylinder and the port 25 communicating with the rear end of the cylinder. There is a positive lap of the valve for exhaust pressure, the amount of which with reference to the negative lap is such that when either port is just cracked open exhaust does not take place, or stated in another way, either of the inlet ports may be just closed without exhaust taking place.

The operation of the gear is as follows. The parts as shown in the drawing are in neutral or mid gear position and if it is desired to move forwardly the shaft 19, under control of the hand wheel in the cab is rotated in a clockwise direction, which causes the sleeve 11 with its connecting member 17 to move toward the rear, the piston 8 acting as a nut, such rearward movement being imparted to the valve 10 which uncovers the port 25 to admit pressure to the rear of the piston. Upon such movement of the valve the port 24 is connected with the exhaust port 27 through the medium of the groove 28 in the under side of the valve, to exhaust pressure from the other or forward end of the cylinder. The limit of possible movement of the valve 10 is determined by the stops 29 which are engaged by the annular shoulders 16 on the sleeve 11.

The pressure admitted to the rear of the piston normally would cause it to move forwardly carrying with it the sleeve, connecting member 17 and valve 10, bringing the valve to substantially middle position as will further appear. However as long as the shaft 19 is being rotated rapidly enough, the valve will be held in its extreme left position, notwithstanding the forward movement of the piston. Continued rotation of the shaft 19 will bring the piston to full forward position of cut off, corresponding to the "corner" in the usual reverse lever mechanism. Upon cessation of rotative movement of the shaft the piston carries the sleeve and valve to substantially middle position cutting off the admission of full application of pressure but leaving bleed pressure.

Since the load on the piston is normally in a forward direction, in actual operation the parts come at rest with the port 25 just covered and with the port 24 just cracked (for purposes of illustration the negative lap has been considerably exaggerated in the drawings). Reservoir pressure bleeds to the forward end of the cylinder maintaining a pressure sufficiently in excess of that in the rear end of the cylinder to compensate for the difference in the areas of the piston faces and the forward pull on the piston. While the device may pump, it will only do so occasionally for the reason that it takes considerable time to build up enough pressure to cause the piston to move rearwardly owing to friction, the difference in area, the pull on the piston, leakage and the fact that although the port 24 is cracked no exhaust takes place through port 25. However if the piston is moved rearwardly port 24 is covered and port 25 is cracked without exhaust through port 24 and the pressure is built up on the rear side of the piston to return it to its selected position of cut off. In case of more marked movement of the piston admission to and exhaust from the cylinder occurs to produce stabilizing conditions.

The operation for rearward movement is very similar except that the rod 19 is moved counter-clockwise and the exhaust takes place through the groove 30 and exhaust port 31.

In the event of an air failure or if the locomotive is in a round house with no air on, it is impossible for the piston to shift beyond the limits determined by the stops 29. Thus for example in a round house, it is impossible for the gear to creep, as is the case in some gears, to the point where reverse will take place and when if air is turned on the locomotive might back through the wall of the roundhouse as has occurred.

I claim:

1. In a servo-motor power reverse gear, a cylinder, a piston having a hollow internally threaded rod, a controlling valve, and an operative connection between valve and piston comprising a rotatable sleeve having a head having threaded engagement with the rod and a rod extending through the sleeve and keyed to the head for turning the sleeve.

2. In a power reverse gear of the servo-motor type the combination of a cylinder, a piston having a threaded rod, a control valve and means for operating the valve comprising a rotatable sleeve having threaded engagement with the piston rod, a rod extending into said sleeve for transmitting said rotary movement, and a connection between said sleeve and the valve.

3. In a power reverse gear of the servo-motor type the combination of a cylinder, a piston having a threaded rod, a control valve and means for operating the valve comprising a rotatable sleeve having threaded engagement with the piston rod, a rod extending into said sleeve for transmitting said rotary movement, and a connection between said sleeve and the valve, the last mentioned rod being held against longitudinal movement and having sliding connection with the sleeve.

4. In a power reverse gear of the servo-motor type the combination of a cylinder, a piston having a threaded rod, a control valve and means for operating the valve comprising a rotatable sleeve having threaded engagement with the piston rod, a rod extending into said sleeve for transmitting said rotary movement, and a connection between said sleeve and the valve said connection being swivelled on the sleeve.

5. In a power reverse gear of the servo-motor type the combination of a cylinder, a piston having a threaded rod, a control valve and means for operating the valve comprising a rotatable sleeve having threaded engagement with the piston rod, a rod extending into said sleeve for transmitting said rotary movement, a connection between said sleeve and the valve and stop means limiting the sleeve against unintended movement.

6. In a power reverse gear of the servo-motor type the combination of a cylinder, a piston having a threaded rod, a control valve and means for operating the valve comprising a rotatable sleeve having a threaded head at its inner end for threaded engagement with the piston rod, a rod extending into said sleeve for transmitting said rotary movement, and a connection between said sleeve and the valve.

7. In a power reverse gear of the servo-motor type the combination of a cylinder, a piston having an internally threaded extension, a control valve and means for operating the valve comprising a rotatable sleeve having threaded engagement with the piston extension, a rod extending through said sleeve and having non-rotative but sliding connection therewith for transmitting said rotary movement and a connection between said sleeve and the valve.

8. In a servo-motor power reverse gear, a cylinder, a piston having a threaded rod, a controlling valve, and an operative connection between valve and piston comprising a rotatable sleeve having threaded engagement with the rod and means for turning the sleeve, said means extending through the sleeve.

In testimony whereof, I have hereunto signed my name.

FREDERICK W. MARTIN.